United States Patent

[11] 3,595,587

| [72] | Inventor | Dino Senigalliesi Turin, Italy |
| --- | --- | --- |
| [21] | Appl. No. | 845,828 |
| [22] | Filed | July 29, 1969 |
| [45] | Patented | July 27, 1971 |
| [73] | Assignee | RIV-SKF Officine di Villar Perosa S.p.A. Turin, Italy |
| [32] | Priority | Aug. 7, 1968 |
| [33] | | Italy |
| [31] | | 52751/A68 |

[54] PROTECTIVE SUPPORT FOR BALL BEARINGS
4 Claims, 5 Drawing Figs.

[52] U.S. Cl. .................................................. 277/169, 308/187.2
[51] Int. Cl. ..................................................... B65d 53/00, F16c 33/78
[50] Field of Search ........................................ 308/187.1; 277/94, 95

[56] References Cited
UNITED STATES PATENTS

| 2,173,250 | 9/1939 | Fay ............................... | 308/187.2 |
| 3,014,768 | 12/1961 | Dickinson ..................... | 308/187.2 |
| 3,090,628 | 5/1963 | Giulietti ........................ | 277/94 |
| 3,206,262 | 9/1965 | Hoag ............................. | 308/187.2 |
| 3,400,989 | 9/1968 | Dixon et al. ................... | 277/94 |

*Primary Examiner*—Edgar W. Geoghegan
*Assistant Examiner*—Frank Susko
*Attorney*—Sughrue, Rothwell, Mion, Zinn & Macpeak

ABSTRACT: A protective support for a ball bearing comprises an annular resiliently pliable element which snaps into engagement with the outer bearing ring and which has at least one circular lip on its inner edge for contacting the cylindrical surface of the inner bearing ring. The annular element is provided with a central radially deformable part which accommodates thermal expansion and prevents deformation of the element.

Fig_1

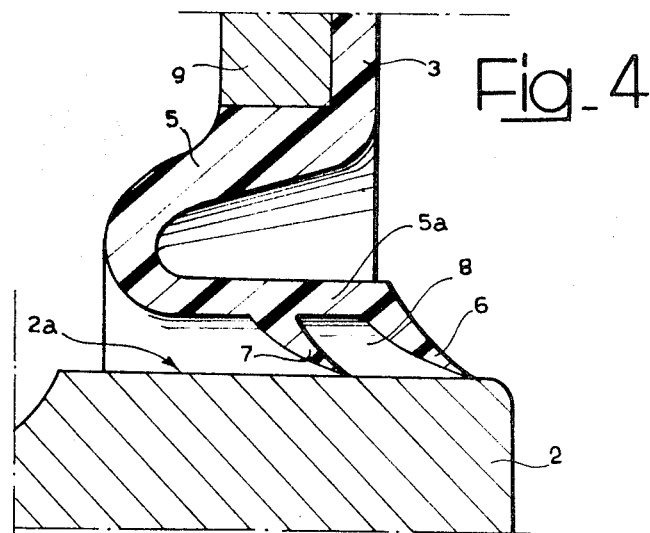
Fig_4
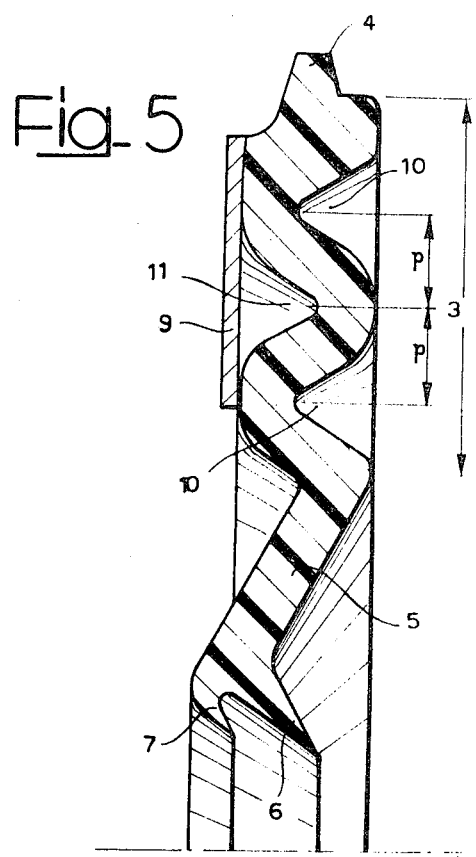
Fig_5

PROTECTIVE SUPPORT FOR BALL BEARINGS

This invention relates to protective supports for ball bearings.

One known form of protective support for a ball bearing is formed by an annular element anchored in special grooves of the outer ring of the ball bearing, and sliding through lips of elasticized pliable material on moulded seats placed in the inner ring of said ball bearing. The fitting of such a protective support requires special skill for the formation of suitable seats in the inner bearing ring, an operation which is made more difficult by the need to obtain perfect concentricity between the rolling track and the seats of the protective support. The expense of providing such supports is consequently further increased by the complication involved in inserting different types of inner bearing rings, whether or not these are provided with seats for protective supports.

An object of the present invention is to provide a protective support for ball bearings, which is effective without requiring special support seats on the inner ring of the ball bearing.

The main characteristic of the protective support according to the invention is that it comprises an annular element of elastically pliable material having an outer edge adapted for anchorage to the outer ring of the ball bearing, and further having a central radially deformable part and at least one circular lip formed on its inner edge and adapted to make contact with the radially outwardly facing cylindrical surface of the inner ring of the ball bearing.

Other characteristics of the invention will be apparent from the following detailed description with reference to the accompanying drawings, which show purely by way of nonlimiting example some practical embodiments of the invention, and in which:

FIG. 4 is an enlarged cross-sectional view of part of the protective support shown in FIG. 3, and FIG. 5 is a cross-sectional view of part of a protective support according to a further embodiment of the invention.

Figure 1:
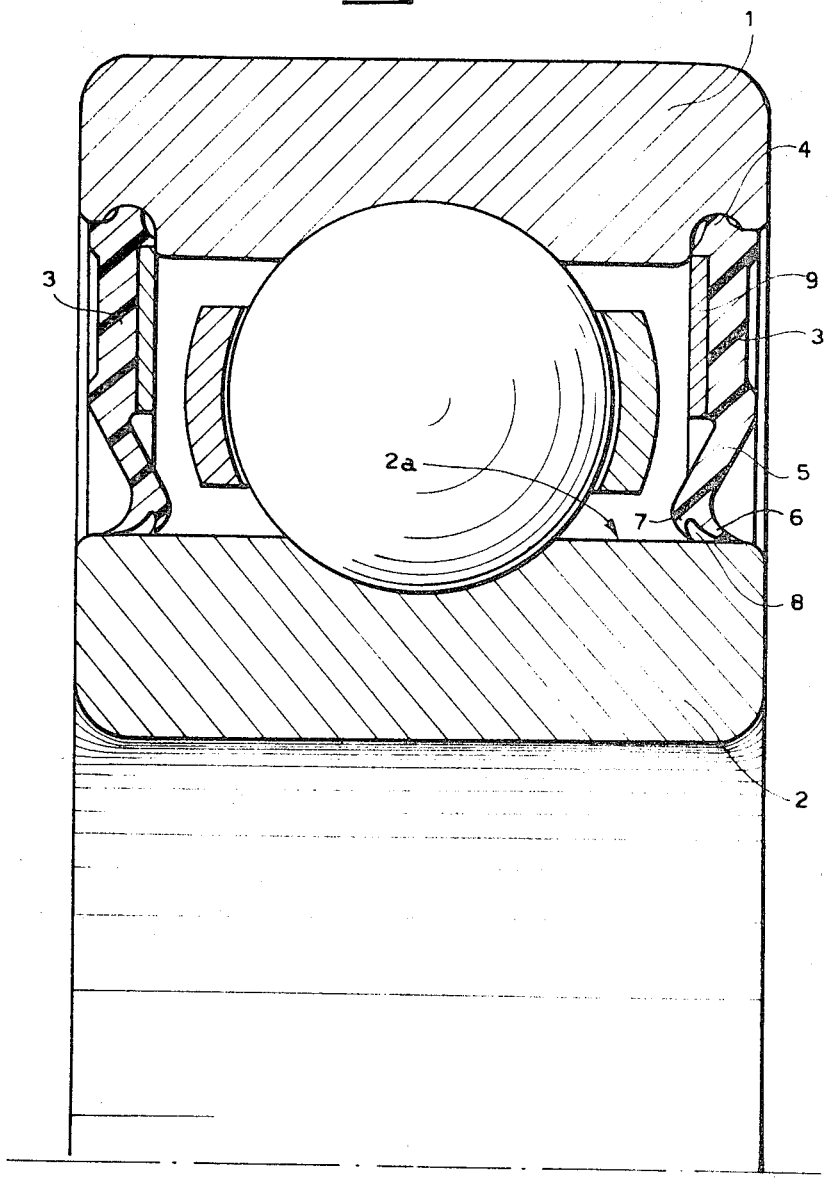
FIG. 1 is a cross section of part of a ball bearing, taken in a plane containing the axis of rotation of the bearing, provided with two protective supports according to one embodiment of the invention.

With reference to FIG. 1, numerals 1 and 2 indicate the inner and outer rings respectively of a ball bearing. Interposed between the two bearing rings 1, 2 are two protective supports in the form of annular elements 3 of elastically pliable material, for example, rubber or plastics material, placed one on each side of the ball bearing.

Each annular element 3 is provided with an outer edge 4 which is inserted into, and maintained by virtue of the resilience of the element 3 in, a corresponding annular groove formed on the radially inwardly facing surface of the outer ring 1 of the ball bearing. Each annular element 3 is further provided with a central part 5 formed so as to be radially deformable. The element 3 shown in FIGS. 1 and 2 has a substantially frustoconical shape.

The central part 5 terminates at the inner edge of the element 3 in two circular lips 6 and 7 which are adapted to make contact with the radially outwardly facing cylindrical surface 2a of the inner ring 2 of the ball bearing, so as to support said ring 2 from the outer ring 1.

The circular lips 6 and 7 are very flexible so as to be able to adapt themselves to the actual profile of the cylindrical surface 2a of the inner ring 2 of the ball bearing, compensating for any irregularity of said surface due to small defects of shape.

Between the two lips 6 and 7 there is formed an annular chamber 8 which holds lubricant in order to reduce the rolling friction between the lips 6, 7 and the inner ring 2 of the ball bearing, and to increase the efficacy of the support.

The shape of the circular lips 6 and 7 is, moreover, such as to ensure self-sharpening of the lips 6 and 7 in consequence of wear in use, prolonging the effective life of the support.

Radially outwardly of the central parts 5 the annular element is formed with a flat part which is reinforced by an annular metallic reinforcing plate 9 attached to the internal face of the said flat part, for example by vulcanization.

Figure 2:
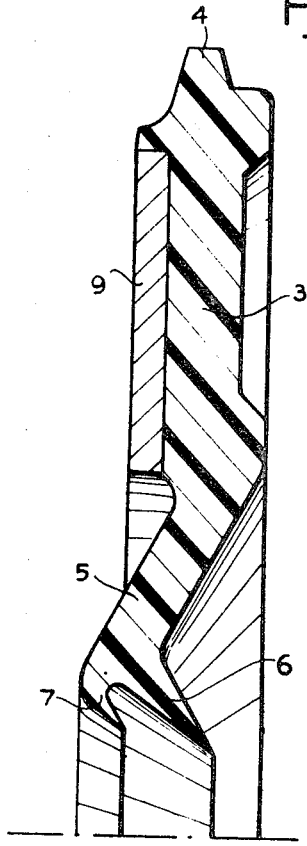
FIG. 2 is an enlarged cross-sectional view of one of said protective supports in a position of rest.
Figure 3:
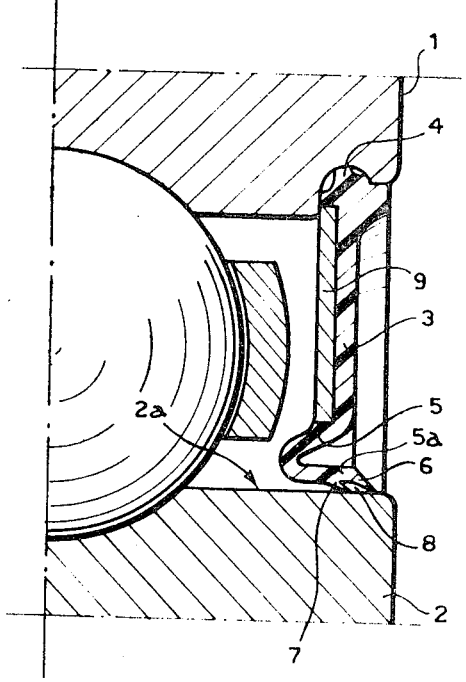
FIG. 3 is a cross-sectional view of one symmetrical half of a ball bearing, corresponding to the view of FIG. 1, showing another embodiment of the protective support according to the invention.

According to the embodiment of Figures 3 and 4, the conical part 5 has a limited radial extent as compared with the protective support of FIGS. 1 and 2. Instead of directly carrying the circular lips 6 and 7, the central part 5 is formed with a substantially cylindrical extension 5a, terminating in the circular lips 6 and 7.

In the embodiment of FIG. 5 a part 3 of the annular element is provided on the side thereof turned towards the outside of the ball bearing with circumferentially extending grooves 10, and on the side turned towards the inside of the bearing further circumferentially extending grooves 11 interspaced with respect to the grooves 10. The grooves 10 and 11 can have a circular shape, being arranged concentrically with each other, or a spiral shape. The grooves 10 alternate with the grooves 11, in a radial direction, successive grooves 10 and 11 being spaced apart radially by an amount $p$ which is substantially equal to half the radial width of each groove 10, 11.

The purpose of the grooves 10 and 11 is to compensate for radial changes of dimensions which may result from the different values of the thermal expansion coefficients of the metal (e.g. steel) parts of the ball bearing and the resilient material of which the protective support is made, preventing in practice the protective support as a whole acquiring a fully frustoconical shape as a result of changes of temperature. As in the embodiments of FIGS. 1 to 4, the annular element is preferably reinforced by an internal flat washer 9, possibly vulcanized to the resilient material of the support.

It will be appreciated that details of construction of embodiments of the invention can be widely varied from those specifically described and illustrated by way of example without departing from the scope of the present invention as defined in the claims which follow.

What I claim is:

1. A protective element for a bearing of the type having spaced-apart inner and outer race rings with the inner ring having a radially outwardly facing cylindrical surface comprising an elastically pliable annular element having an outer edge adapted to be anchored to the outer ring of the bearing, a central radially deformable portion and at least one circular lip formed on the inner edge thereof and adapted to make contact with the radially outwardly facing cylindrical surface of the inner ring of the bearing, said central portion of the annular element having substantially circumferentially extending grooves arranged alternately on the internal and external faces respectively of said element.

2. Protective support according to claim 1, in which said grooves are circular and are concentric with one another.

3. Protective support according to claim 2, in which successive said grooves are spaced radially by a distance of the order of half the radial width of each groove.

4. Protective support according to claim 1, in which the grooves are spiral in shape.